(12) United States Patent
August et al.

(10) Patent No.: US 8,565,119 B2
(45) Date of Patent: Oct. 22, 2013

(54) NETWORK DISCOVERY AND DATA TRANSFER USING SNMP IN AN ELECTRIC POWER TRANSMISSION OR DISTRIBUTION SYSTEM

(75) Inventors: Jared P. August, Pullman, WA (US); Kenneth J. Fodero, Pullman, WA (US); Andrew Hilton, North Vancouver (CA)

(73) Assignee: Schweitzer Engineering Laboratories Inc, Pullman, WA (US)

(*) Notice: Subject to any disclaimer, the term of this patent is extended or adjusted under 35 U.S.C. 154(b) by 952 days.

(21) Appl. No.: 12/578,497

(22) Filed: Oct. 13, 2009

(65) Prior Publication Data

US 2010/0260066 A1 Oct. 14, 2010

Related U.S. Application Data

(60) Provisional application No. 61/168,984, filed on Apr. 14, 2009.

(51) Int. Cl.
*H04L 12/28* (2006.01)

(52) U.S. Cl.
USPC ............................ 370/254; 709/220; 709/223

(58) Field of Classification Search
None
See application file for complete search history.

(56) References Cited

U.S. PATENT DOCUMENTS

| | | | |
|---|---|---|---|
| 5,185,860 A * | 2/1993 | Wu | 709/224 |
| 6,442,144 B1 * | 8/2002 | Hansen et al. | 370/255 |
| 7,043,541 B1 * | 5/2006 | Bechtolsheim et al. | 709/223 |
| 7,085,938 B1 | 8/2006 | Pozzuoli | |
| 7,187,709 B1 | 3/2007 | Menon | |
| 7,360,954 B1 | 4/2008 | Seaver | |
| 2002/0156920 A1 | 10/2002 | Conrad | |
| 2003/0046427 A1 * | 3/2003 | Goringe et al. | 709/242 |
| 2003/0112765 A1 * | 6/2003 | Gaspard et al. | 370/252 |
| 2004/0025010 A1 | 2/2004 | Azema | |
| 2004/0039808 A1 * | 2/2004 | Ohara | 709/223 |
| 2004/0071389 A1 | 4/2004 | Hofmeister | |
| 2004/0131014 A1 * | 7/2004 | Thompson et al. | 370/230 |
| 2005/0049976 A1 | 3/2005 | Yang | |
| 2005/0240775 A1 | 10/2005 | Chan | |
| 2005/0265717 A1 | 12/2005 | Zhou | |
| 2006/0025018 A1 | 2/2006 | Dube | |
| 2006/0277346 A1 | 12/2006 | Doak | |
| 2007/0258715 A1 | 11/2007 | Androni | |
| 2007/0294496 A1 | 12/2007 | Goss | |

(Continued)

OTHER PUBLICATIONS

PCT/US2010/050966, Patent Cooperation Treaty, International Search Report and Written Opinion of the International Searching Authority, Nov. 26, 2010.

(Continued)

*Primary Examiner* — Brian Roberts
(74) *Attorney, Agent, or Firm* — Jared L. Cherry

(57) ABSTRACT

Disclosed herein are systems and methods for performing network discovery and file transfer utilizing Simple Network Management Protocol (SNMP). According to one embodiment, a manager queries an agent device to obtain an agent device's neighbor address table comprising IP addresses of neighboring devices. IP addresses comprised in the agent device's neighbor address table may be added to a network inventory. The manager device may then iteratively query each device in the network inventory until each of the plurality of agent devices have been queried. According to one embodiment, a device may divide a data file into a plurality of sequenced partitions. A plurality of packets may be created containing the sequenced partitions. A receiving device may reconstruct the data file using the sequenced partitions.

15 Claims, 9 Drawing Sheets

(56) References Cited

U.S. PATENT DOCUMENTS

| | | | |
|---|---|---|---|
| 2008/0104584 | A1 | 5/2008 | Murata |
| 2008/0109822 | A1* | 5/2008 | Chokshi et al. ............... 719/318 |
| 2008/0235355 | A1* | 9/2008 | Spanier et al. ............... 709/219 |
| 2009/0070447 | A1 | 3/2009 | Jubinville |
| 2009/0228982 | A1 | 9/2009 | Kobayashi |

OTHER PUBLICATIONS

PCT/US2010/050908, Patent Cooperation Treaty, International Search Report and Written Opinion of the International Searching Authority, Nov. 24, 2010.

PCT/US2010/050918, Patent Cooperation Treaty, International Search Report and Written Opinion of the International Searching Authority, Feb. 8, 2011.

David T. Stott, Avaya Labs Research, Avaya Inc., Layer-2 Path Discovery Using Spanning Tree MIBs, Mar. 7, 2002.

D. Levi, J. Schoenwaelder, Tu Braunschweig, RFC 3165—Definitions of Managed Objects for the Delegation of Management Scripts, <http://tools.ietf.org/html/rfc3165#section-7.1> Aug. 2001.

Adtran, Atlas 830, Integrated Access Device, Sep. 2003.

A. Bierman, K. Jones, RFC2922—Physical Topology MIB, <http://www.faqs/org/rfcs/rfc2922.html>, Sep. 2000.

Suman Pandey, Mu-Jung Choi, Sung-Joo Lee, James W. Hong, IP Network Topology Discovery Using SNMP, Science and Engineering, Postech, Korea, Jan. 20, 2009.

Kenneth C. Behrendt, Michael J. Dood, Substation Relay Data and Communication, Oct. 1995.

E.O. Schweitzer III, Gary W. Scheer, David Dolezilek, Comparison of SEL-2020 Star Network to Shared Networks, Nov. 1999.

Douglas Proudfoot, Dave Taylor, How to Turn a Substation into a Database Server, Apr. 1999.

* cited by examiner

NETWORK DISCOVERY AND DATA TRANSFER USING SNMP IN AN ELECTRIC POWER TRANSMISSION OR DISTRIBUTION SYSTEM

RELATED APPLICATIONS

The present application claims the benefit under 35 U.S.C. §119(e) of U.S. Provisional Patent Application No. 61/168,984 filed Apr. 14, 2009, titled "NETWORK MANAGEMENT OF DEVICES IN AN ELECTRIC POWER TRANSMISSION OR DISTRIBUTION SYSTEM," which application is incorporated herein by reference in its entirety.

TECHNICAL FIELD

This disclosure relates to active network discovery and data transfer using Simple Network Management Protocol (SNMP). More particularly, this disclosure relates to systems and methods for network topology discovery and packetized data transfers using SNMP.

BRIEF DESCRIPTION OF THE DRAWINGS

Additional aspects and advantages will be apparent from the following detailed description of preferred embodiments, which proceeds with reference to the accompanying drawings.

Figure 1A:
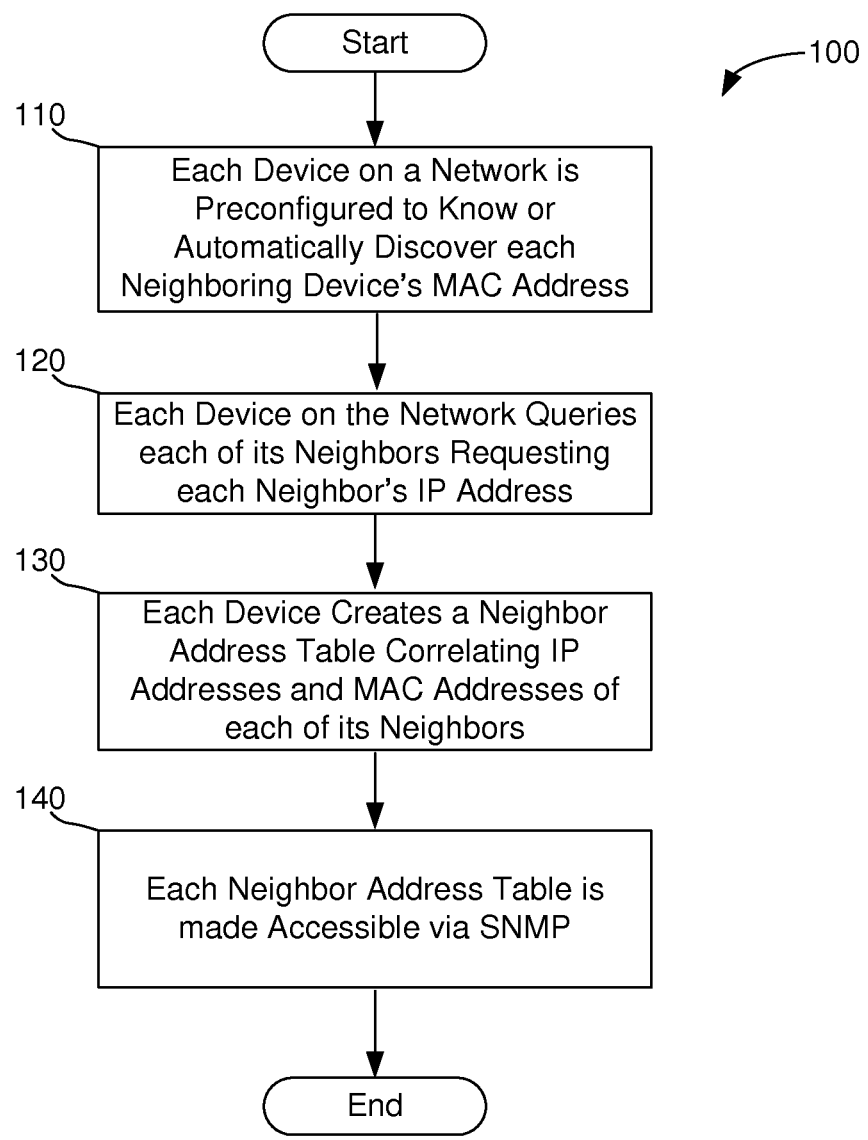
FIG. 1A illustrates a flow diagram of an exemplary method of creating a custom management information base including IP addresses of neighboring devices using SNMP.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Simple network management protocol (SNMP) is a widely deployed Internet protocol used to manage networked devices. SNMP may be used to communicate information between a manager device and an agent device. Devices may include, but are not limited to, intelligent electronic devices (IEDs), multiplexers, routers, access servers, switches, bridges, hubs, Internet Protocol (IP) telephones, computer hosts, and printers. Networked devices may be configured to act as a manager device or as an agent device. In fact, a device may be configured to act as a manager device sometimes and as an agent device at other times. SNMP is carried over the User Datagram Protocol (UDP), which is in turn carried over an Internet protocol such as IPv4 or IPv6. Consequently, each device on the network is assigned a unique IP address. As set forth herein, devices on the network may communicate using assigned IP addresses via SNMP.

As used herein, the term network discovery refers to the process of identifying devices on a network and identifying the IP addresses of the identified devices. Network topology refers to information regarding the interconnections between various identified networked devices. When performing network discovery, a manager device communicates with other devices connected to the network.

According to the Open System Interconnection Reference Model ("OSI Model") SNMP operates at the application layer. As such, SNMP typically communicates using IP addresses. SNMP typically relies on some other protocol to supply the IP addresses of devices on the network. Utilizing the techniques disclosed herein, a device may conduct network discovery, and may accordingly identify the IP address of other devices on the network without relying on other protocols.

Certain advantages may be realized by utilizing SNMP in an electric power transmission or distribution system. For example, SNMP, as is indicated by its name, is a simple protocol, that can be implemented using relatively simple components. Such components may have a lower cost and lower complexity. Further, the systems and methods disclosed herein allow for greater flexibility and control over a network by allowing network discovery and data transfer to be performed via SNMP.

According to one embodiment, devices connected to a network are preconfigured to know or configured to automatically discover the Media Access Control (MAC) address of each device with which it is in direct communication. Accordingly, each device knows the MAC address of each of its neighbors, and is able to query neighboring devices using the MAC address in order to determine the neighboring device's IP address. Consequently, according to the present embodiment, each device on the network is able to discover the IP address of each neighboring device. Each device may then create a neighbor address table correlating the MAC address of each neighbor with the neighbor's IP address. In certain embodiments, the neighbor address table may be stored within a Management Information Base (MIB). A MIB is a form of database stored in a device, which may be made available to other devices using SNMP.

A manager device may query a known first agent device for information contained within the agent device's neighbor address table. The first agent device may return the IP address of each of its neighboring devices, as stored in the first agent device's neighbor address table. Using the newly received addresses corresponding to the first agent device's neighbor address table, the manager device may query each of the first agent device's neighbors requesting their respective neighbor address tables. The manager device may then iterate this process through the entire network by contacting each device in turn and discovering its neighbors. This process allows efficient discovery of every node in the network as well as network connections between devices. Thus, exhaustive network discovery and network topology discovery may be performed using SNMP.

Additionally, in a network comprising devices configured to utilize SNMP, it may be desirable to transfer data files larger than the maximum size of a single SNMP data packet. Furthermore, SNMP does not guarantee the packets will arrive in a particular order. For these reasons, SNMP does not inherently support the transfer between devices of data files that exceed the maximum size of an SNMP data packet. The presently described systems and methods provide for the transmission of data files exceeding the maximum size of an SNMP data packet between devices on a network using SNMP.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer-readable storage medium), a method, and a product of a process.

The phrases "connected to," "networked," and "in communication with" refer to any form of interaction between two or more entities, including mechanical, electrical, magnetic, and electromagnetic interaction. Two components may be connected to each other even though they are not in direct physical contact with each other and even though there may be intermediary devices between the two components.

Much of the infrastructure that can be used with embodiments disclosed herein is already available, such as: general-purpose computers; computer programming tools and techniques; and digital storage media. A computer may include a processor such as a microprocessor, microcontroller, logic circuitry, or the like. The processor may include a special purpose processing device such as an ASIC, PAL, PLA, PLD, Field Programmable Gate Array, or other customized or programmable device. The computer may also include a computer-readable storage device such as non-volatile memory, static RAM, dynamic RAM, ROM, CD-ROM, disk, tape, magnetic, optical, flash memory, or other computer-readable storage medium.

As used herein, the term IED may refer to any microprocessor-based device that monitors, controls, automates, and/or protects monitored equipment within the system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including but not limited to multiplexers, routers, hubs, gateways, firewalls, and switches.

Aspects of certain embodiments described herein are illustrated as software modules or components. As used herein, a software module or component may include any type of computer instruction or computer executable code located within a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The software modules described herein tangibly embody a program, functions, and/or instructions that are executable by computer(s) to perform tasks as described herein. Suitable software, as applicable, may be readily provided by those of skill in the pertinent art(s) using the teachings presented herein and programming languages and tools, such as XML, Java, Pascal, C++, C, database languages, APIs, SDKs, assembly, firmware, microcode, and/or other languages and tools.

Furthermore, the described features, operations, or characteristics may be combined in any suitable manner in one or more embodiments. It will also be readily understood that the order of the steps or actions of the methods described in connection with the embodiments disclosed herein may be changed as would be apparent to those skilled in the art. Thus, any order in the drawings or detailed description is for illustrative purposes only and is not meant to imply a required order, unless specified to require an order.

In the following description, numerous details are provided to give a thorough understanding of various embodiments. One skilled in the relevant art will recognize, however, that the embodiments disclosed herein can be practiced without one or more of the specific details, or with other methods, components, materials, etc. In other instances, well-known structures, materials, or operations are not shown or described in detail to avoid obscuring aspects of this disclosure.

FIG. 1A illustrates an exemplary method 100 of creating a neighbor address table correlating an IP address and a MAC address of each neighbor of a particular device. The neighbor address table may be accessible to other devices on the network via SNMP. In certain embodiments, the neighbor address table may be embodied as a MIB. According to one exemplary embodiment, a network includes any number of networked agent devices as well as at least one manager device. The networked agent devices are configured to create custom MIBs containing the IP addresses of neighboring agent devices. A manager device communicating with an agent device via SNMP is able to retrieve the custom MIB and thereby obtain the IP addresses of additional agent devices on the network. Neighboring devices may include any number of directly connected devices or wirelessly connected devices in direct communication.

According to one embodiment, each agent device is pre-configured to know the MAC addresses of neighboring agent devices 110. Alternatively, agent devices are configured to automatically obtain the MAC address of neighboring devices 110. According to various embodiments this may be accomplished through the use of link-layer protocol. A networked device may query a neighboring device for its IP address if the neighboring device's MAC address is already known. Accordingly, each device on the network queries each of its neighbors to determine each neighbor's IP address 120. Each device then creates a neighbor address table that correlates the IP address and MAC address of each of its neighbors 130. The neighbor address table may be configured to be accessible to one or more devices via SNMP 140.

Figure 1B:
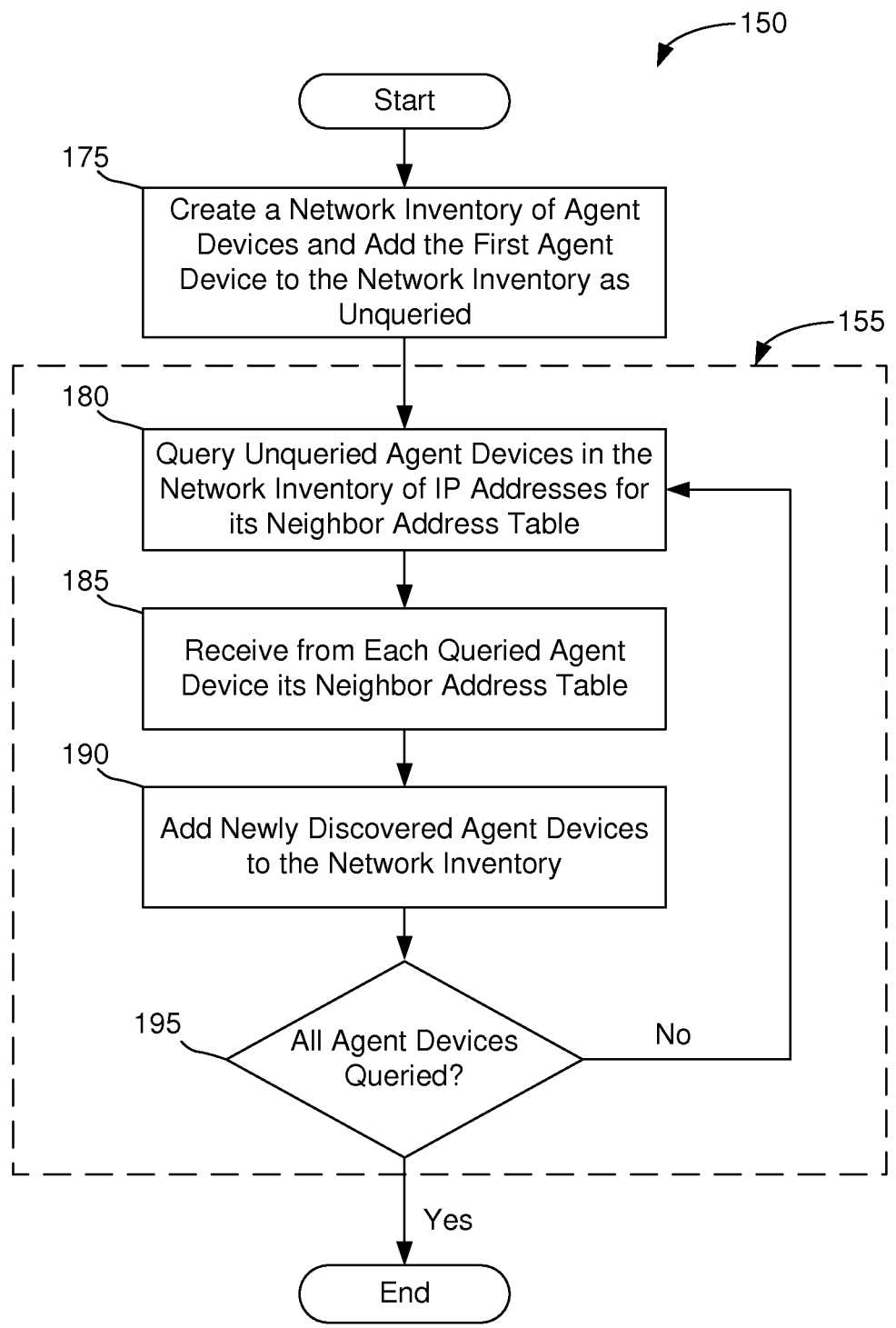
FIG. 1B illustrates a flow diagram of one embodiment of a method for network discovery using SNMP.

FIG. 1B illustrates a flow diagram of one embodiment of a method 150 for identifying devices on a network, in which the method of FIG. 1A has been completed by each device. Initially, an SNMP manager has a record of a first node's IP address or domain name. The manager device may create a network inventory of IP addresses corresponding to agent devices 175. The network inventory may initially include only one IP address (e.g., the IP address of the first agent device). The manager device may initially add each newly discovered device to the network inventory, and designate the newly discovered device as unqueried 175.

A process of network discovery 155 may now be performed by the manager device by iteratively querying each previously unqueried device in the network inventory and requesting the device's neighbor address table 180. In response to the query, the manager device receives from each queried agent device its neighbor address table 185. The manager device determines which devices are newly discovered (e.g., devices that were previously not included in the network inventory), and adds newly discovered devices to the network inventory 190. If an agent device included in the list of devices received from a queried agent device is already in the network inventory, the agent device is not added again to the network inventory.

The process of network discovery 155 is complete when every agent device in the network inventory has been queried 195. If during the last iteration of the network discovery process 155 at least one new IP address was added to the inventory, the process 155 is repeated.

According to another embodiment, in addition to using method 150 to perform network discovery, a manager device may resolve the topology of the network using the returned values of the neighbor address table of each agent device. That is, in addition to discovering the IP address of each device connected to the network, a manager device may create a representation of the connections between each networked agent device. Each agent device may represent a node in the topological representation of the network. Receiving a neighbor address table from one agent device containing the IP address of another agent device may represent a connection between the two agent devices. Consequently, a manager device may request a neighbor address table identifying neighboring devices from each agent device and thereby generate a complete network map of all the interconnections between agent devices on a network.

Figure 2:
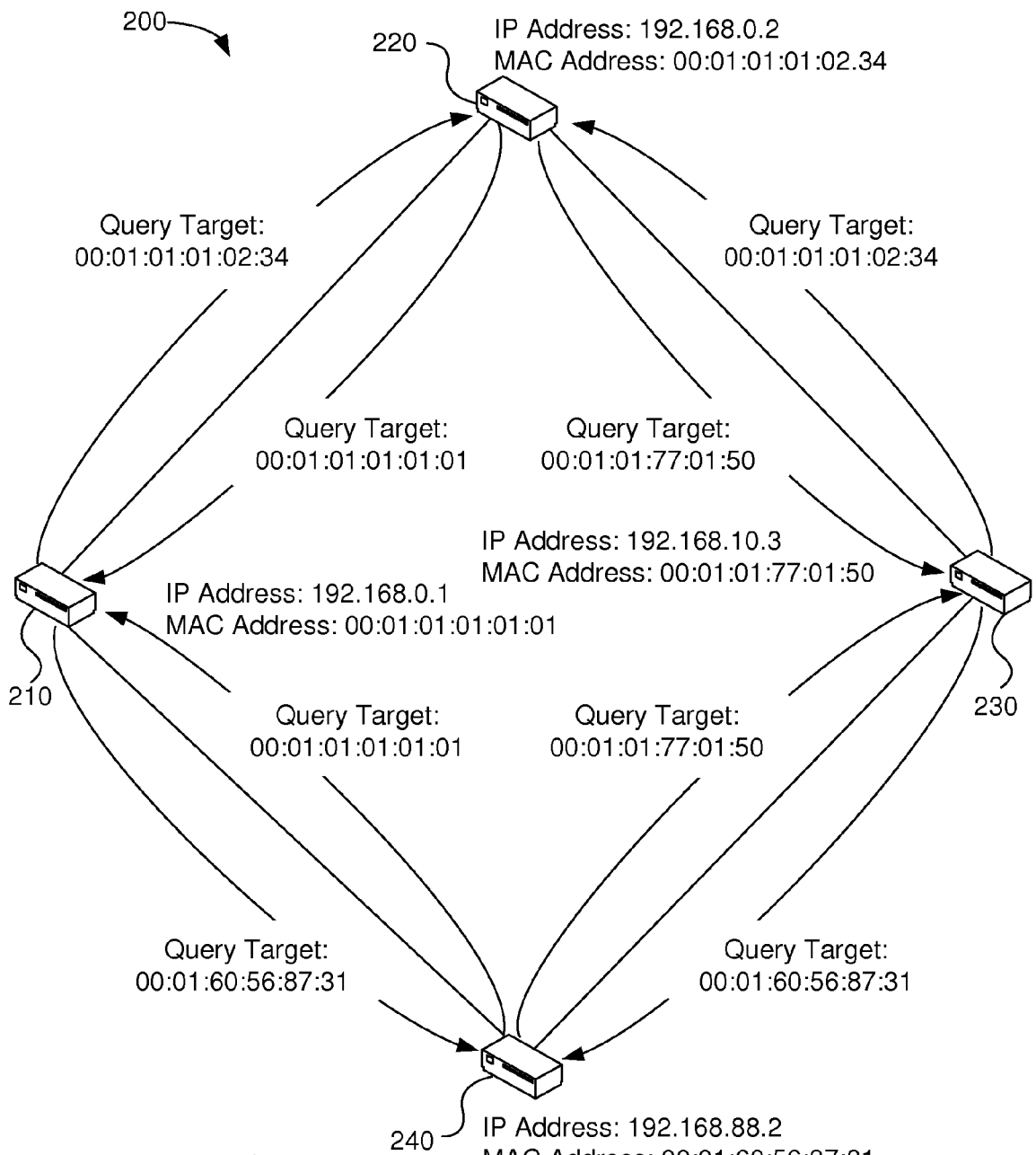
FIG. 2 illustrates an exemplary network of agent devices configured to automatically query each neighbor device and request the neighboring device's IP address.

FIG. 2 illustrates an exemplary network 200 comprising agent devices configured to automatically query neighbor devices for the neighboring device's IP address. As illustrated, each agent device 210, 220, 230, and 240 has a MAC address and an IP address in network 200. According to one embodiment, each agent device is preconfigured with or configured to automatically determine the MAC addresses of neighboring agent devices. According to the illustrated embodiment, each agent device is configured to query neighboring agent devices and request the neighboring agent device's IP address using a known MAC address.

The process of querying a neighboring device may be accomplished using a protocol, such as Inverse Address Resolution Protocol (IARP) or other link-layer protocols. In one embodiment, each node in a network may discover the addresses of each immediately connected neighbor via IARP. In such embodiments, the process of querying neighboring devices may be accomplished using packets that are not to be propagated past the directly connected neighbor. In this way, each device includes in its neighbor address table only those devices to which it is directly connected, and accordingly, the topology of the network may be properly determined by querying each device and determining each device's directly connected neighbor(s).

As illustrated, a first agent device 210 has neighboring agent devices 220 and 240. The first agent device 210 may query a second agent device 220 and a third agent device 240 requesting their respective IP addresses. Thus, agent device 210 queries agent device 220 using the target MAC address of agent device 220. Similar requests are made from agent device 210 to agent device 240, agent device 220 to agent devices 210 and 230, agent device 230 to agent devices 220 and 240, and agent device 240 to agent devices 210 and 230. In some embodiments, other types of information may also be determined about each neighboring agent device. For example, agent devices may query neighboring devices to determine the type of each device, the types of resources or services provided by each device, or other characteristics. Such information may be included in a neighbor address table or other data structure.

Figure 3:
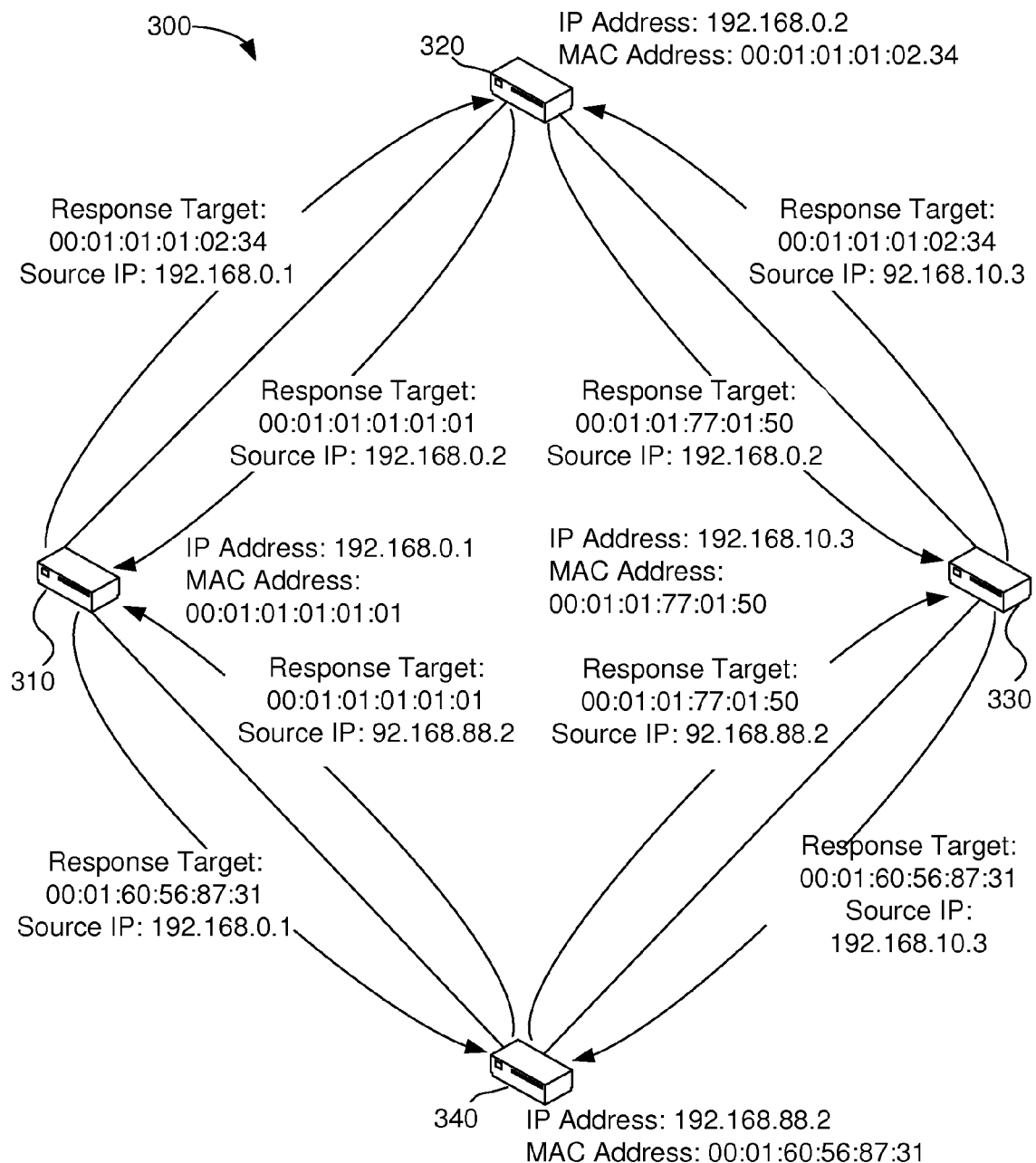
FIG. 3 illustrates an exemplary network of agent devices providing IP addresses to neighboring devices in response to a query.

FIG. 3 illustrates an exemplary network 300 comprising agent devices, in which each device returns its IP address to neighboring devices after being queried. Accordingly, in response to the queries by agent devices 320 and 340, agent device 310 transmits its IP address to each of the requesting agent devices 320 and 340. Likewise, agent devices 320, 330, and 340 transmit their respective IP address to each of their neighbors. In this manner, each agent device on the network 300 retrieves the IP address of each neighboring agent device.

According to one embodiment, after an agent device has received the IP address of at least one of its neighbors, a neighbor address table is created. A neighbor address table may correlate the MAC address of each neighbor with the neighbor's IP address. The neighbor address table may be accessible to a manager device, or other device, via SNMP. Additionally, while the presently illustrated embodiment includes only four agent devices connected in a diamond shape, such that each device has two neighboring devices, the described method for creating MIBs may be employed in a network containing any number of agent devices, including any number of interconnections between devices. Furthermore, although consistently referred to as agent devices, during communication with other devices an agent device may also perform functions assigned to manager devices. In various embodiments, more than one device may perform functions assigned to the manager device.

Figure 4:
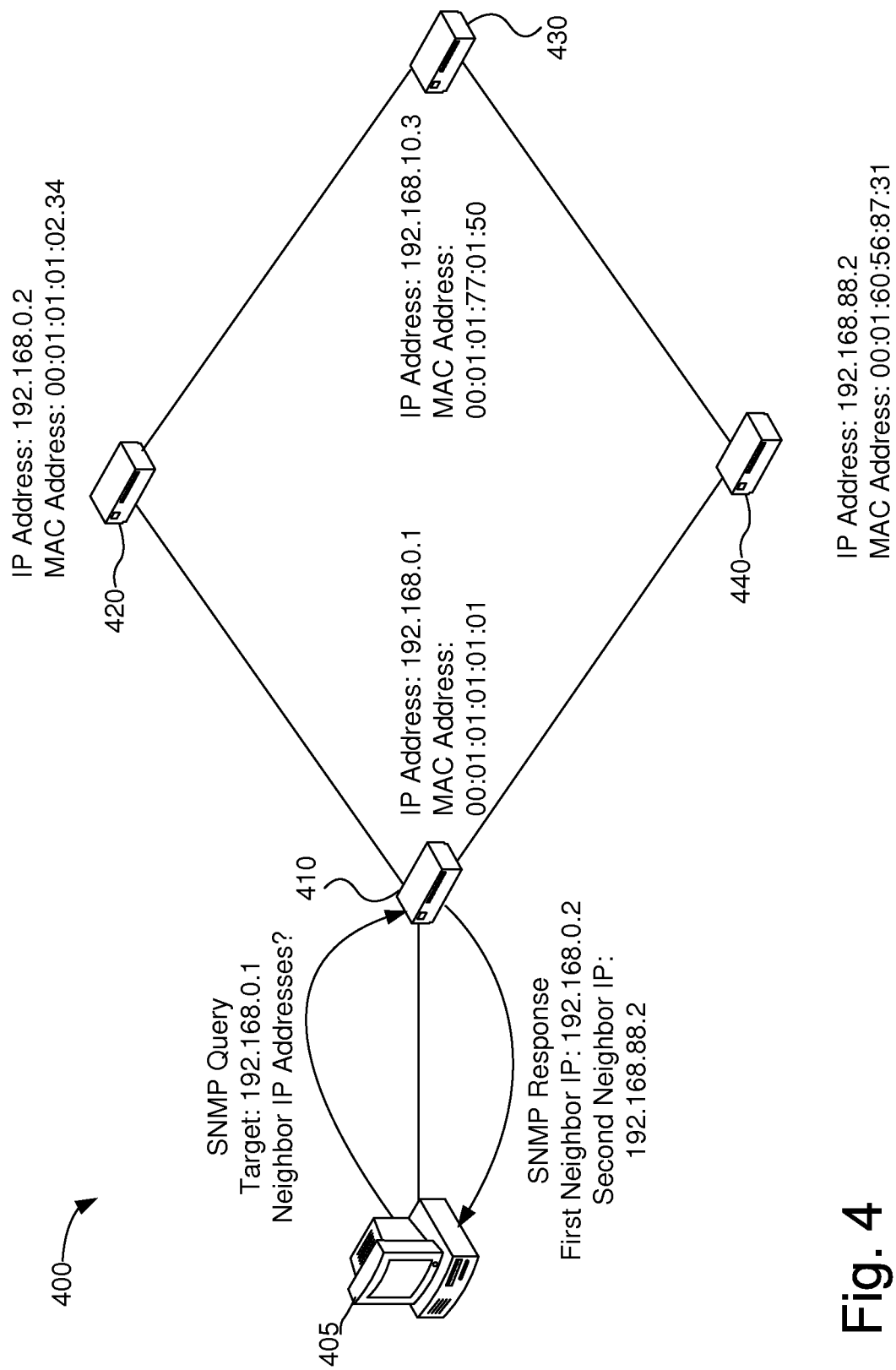
FIG. 4 illustrates an exemplary network including a manager device querying a first agent device for the IP addresses of neighboring devices using SNMP.

FIG. 4 illustrates a manager device 405 connected to a network 400 comprising agent devices 410, 420, 430, and 440. The manager device 405 may already know the IP address of a first agent device 410. Alternatively, it may query the first agent device 410 using a known MAC address to retrieve the first agent device's IP address. To perform network discovery, the manager device 405 may create an inventory of known IP addresses. The first agent device 410 may initially be the only known IP address and thus the only IP address in the inventory. The manager device 405 may query the first agent device 410 requesting the device's neighbor address table.

The first agent device 410 may respond to the query by providing its neighbor address table, which may include the IP addresses of the first 420 and second 440 neighboring agent devices. The manager device may compare the agent devices listed in the neighbor address table with the inventory of known agent devices. Any agent devices not currently in the network inventory may be added to the network inventory and marked as unqueried. The manager device proceeds with network discovery by querying each of the newly identified agent devices in the network inventory and requesting a MIB containing the IP addresses of neighboring agent devices. If new devices are identified, they are added to the network inventory and the process continues. When every device in the network inventory has been queried by the manager device and no new addresses are added to the network inventory, the network discovery process ends.

Continuing the discussion regarding FIG. 4, in response to a query from manager device 405, agent device 410 identifies agent devices 420 and 440 as its neighbors. The manager device 405 will then query agent device 420 requesting the device's neighbor address table. The neighbor address table of agent device 420 will include devices 410 and 430. Because agent device 410 is already in the network inventory, manager device 405 may only add agent device 430 to the network inventory. Manager device 410 will then query agent device 440, which will identify agent devices 410 and 430 as its neighbors. Because both of these devices are already in the network inventory, no IP addresses will be added to the network inventory from the neighbor address table received from agent device 440. Unqueried agent device 430 is then queried and identifies agent devices 420 and 440 as its neighbors. As both of these devices are already in the network inventory, no new IP addresses will be added to the network inventory. The manager device may again evaluate if any agent device in the network inventory has not been queried. As all the agent devices have been queried, network discovery is complete and the process ends.

Figure 5:
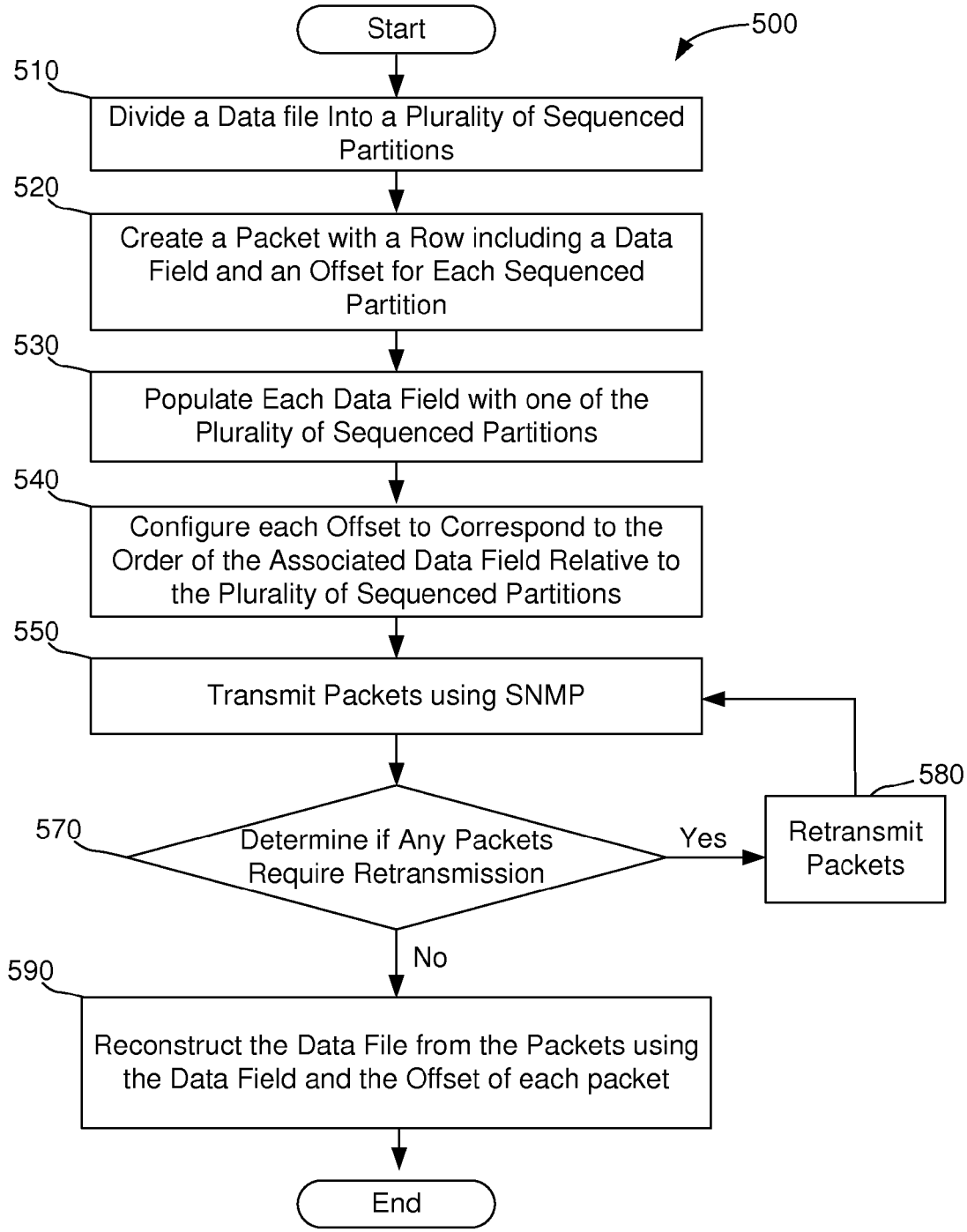
FIG. 5 illustrates a flow diagram of one embodiment of a method of packetized data transmission via SNMP.

In addition to network discovery, a device may be able to transmit a large file using SNMP. SNMP transfers data in packets of a limited size. FIG. 5 illustrates a method 500 whereby a data file exceeding the maximum size of a data packet may be transmitted from one device to another using SNMP. According to the illustrated embodiment, a device divides a data file into a plurality of sequenced partitions, each of which is smaller than the maximum SNMP packet size 510. For each sequenced partition, a packet is created containing a data field and an offset 520. Each data field is populated with one of the plurality of sequenced partitions 530. Each offset is configured to correspond to the order of the associated data field relative to the plurality of sequenced partitions 540.

For example, a large data file may be broken up into three sequenced partitions, A, B, and C. By concatenating A, B, and C in the correct order, the original data file can be reproduced. For each partition, a transmitting device may create a packet containing an offset field and a data field. The offset field is populated with sequencing information (e.g., any indication of the relative order of the partitions), and the data field is populated with a corresponding sequenced partition.

According to various embodiments, devices may communicate using any of SNMPv1, SNMPv2, or SNMPv3. These versions of SNMP, as well as subsequently planned versions, utilize packets of limited size to transfer information. SNMPv2 and SNMPv3 natively support the ability to create a table with an arbitrary number of rows and columns. While SNMPv1 does not natively provide a method for a manager device to add rows to a table in an agent device, a number of supplemental methods for accomplishing this functionality have been developed. According to one embodiment, a device is configured to use this built in table function to create a table in each packet that includes a row with two columns. The first column may be an offset field and a second column may be a data field. The manager device may be configured to utilize this table to divide a data file that exceeds the maximum SNMP data packet size into a plurality of sequenced packets. A receiving device may be similarly configured to interpret the built-in table of an SNMP packet as having an offset field and a data field. In this manner, existing SNMP may be used to packetize large files into a plurality of sequenced packets, each of which is smaller than the maximum size allowed for an SNMP data packet.

A transmitting device may transmit the packets to a receiving device via SNMP 550. During transmission and/or after transmission, the transmitting device and the receiving device may determine which packets, if any, require retransmission 570. In embodiments in which the determination of whether any packets require retransmission is made concurrently with the transmission, the receiving device may be able shift received data out of RAM into another storage medium. Accordingly, the agent device may therefore be able to make more efficient use of the device's available memory resources. In certain embodiments, this determination 570 may be accomplished by the receiving device, which may examine each received packet and determine whether any packets require retransmission. In other embodiments, the determination of whether any packets require retransmission 570 may include the transmitting device querying the receiving device to make the determination 570. If the transmitting and/or receiving device determine that retransmission of any packets is required 570, the necessary packets are retransmitted 580. The agent device may reconstruct the original data file by concatenating the plurality of partitions contained in the data fields and using the corresponding offset information to determine the correct sequence 590.

According to another embodiment using the table feature available in SNMP, each packet may also include a third column containing a length or size of the packet and/or data field. According to this embodiment, a receiving device may utilize the length or size information to determine when the entire packet or data field has been received and/or processed. Additionally, according to one embodiment, a specific purpose of the file transfer may be to initiate a firmware update. That is, a transmitting device may be able to transmit a firmware update to a receiving device via SNMP using method 500 described in FIG. 5. The ability to update firmware via SNMP may be useful in a system that utilizes SNMP for management of a variety of types of devices.

Figure 6:
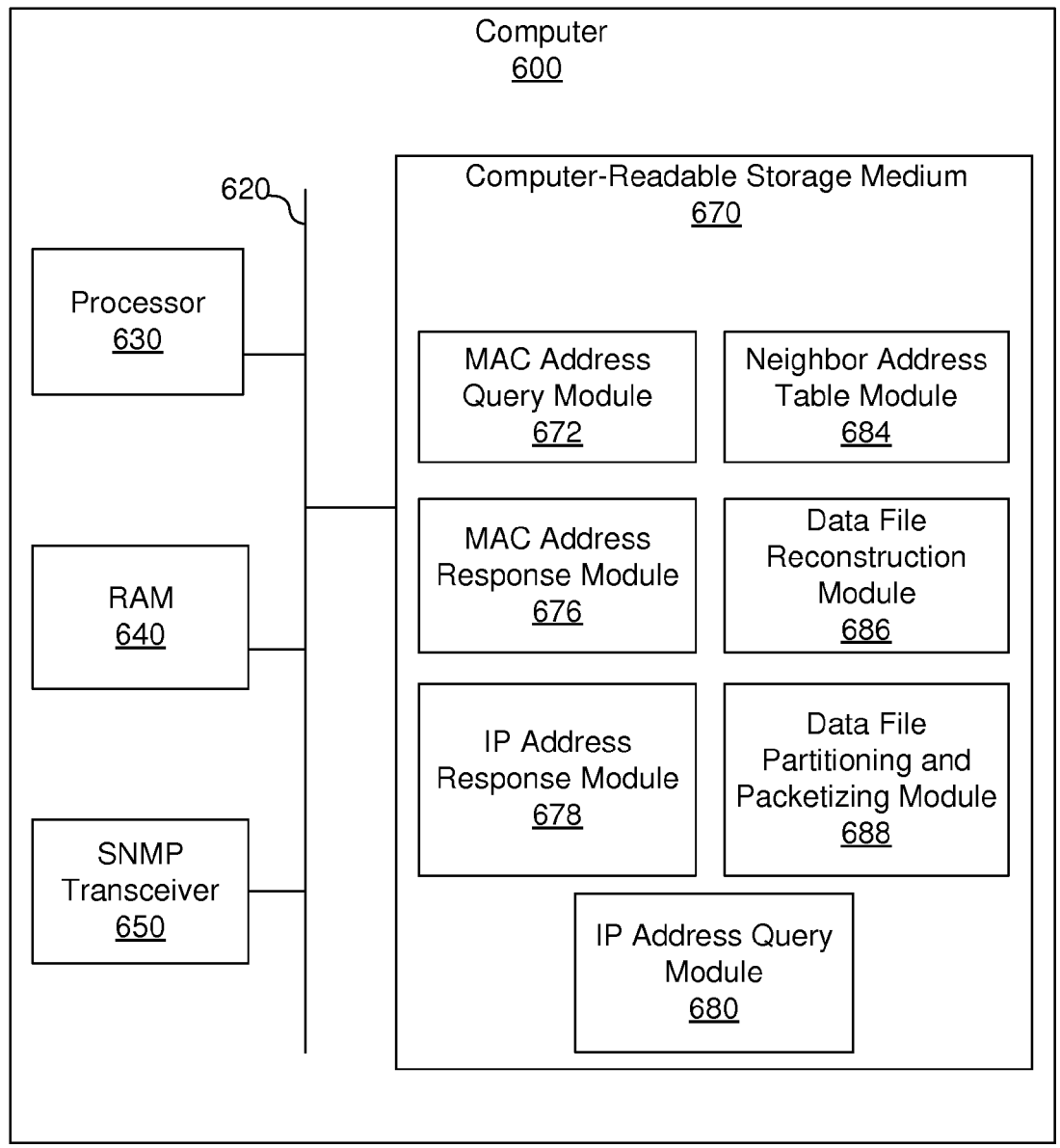
FIG. 6 is an exemplary functional block diagram of a computer system configured to perform network discovery and packetized data transmission via SNMP.

FIG. 6 illustrates one possible embodiment of a computer system 600 that may be utilized to function as a manager and/or agent device to perform the various methods of network discovery and/or the transfer of data files as described herein. A computer system 600 includes a processor 630, a computer-readable storage medium 670, Random Access Memory (RAM) 640, and a bus 620. Additionally, the bus 620 may be connected to a hardware or software implemented SNMP transceiver 650. In alternative embodiments, SNMP transceiver 650 may be a peripheral device connected to computer system 600 via an input/output port.

Bus 620 provides a connection between RAM 640, processor 630, and computer-readable storage medium 670. Processor 630 may be embodied as a general-purpose processor, an application specific processor, a microcontroller, a digital signal processor, a field-programmable logic array, or other device known in the art. Processor 630 performs logical and arithmetic operations based on program code stored within computer-readable storage medium 670.

Computer-readable storage medium 670 may comprise various modules executable on the processor for performing network discovery and/or packetized data file transfer via SNMP. Exemplary modules include a MAC address query module 672, MAC address response module 676, IP address response module 678, IP address query module 680, a neighbor address table module 684, data file reconstruction module 686, and data file partitioning and packetizing module 688. Each module may perform one or more tasks associated with SNMP network discovery and/or file transfer. One of skill in the art will recognize that certain embodiments may utilize more or fewer modules than are shown in FIG. 6, or alternatively combine multiple modules into a single module. Particularly, some devices may contain only those modules necessary to perform the functions required of an agent device as described herein.

According to various embodiments, MAC address query module 672 may be configured to automatically query neighboring devices and request their MAC addresses. MAC address response module 676 may be configured to return a device's MAC address upon request. In certain embodiments, MAC address response module 676 may also be configured to utilize multicast or other similar technologies to provide its MAC address to neighboring IP networked devices. IP address response module 678 may be configured to return a device's IP address when requested. IP address query module 680 may be configured to request the IP addresses of neighbor devices utilizing a known MAC address. Neighbor address table module 684 may store a neighbor address table correlating the MAC address of each neighbor with the neighbor's IP address. Neighbor address table module 684 may also be configured to transmit the neighbor address table when requested via SNMP. In certain embodiments utilizing Synchronized Optical Networking (SONET) to carry data between the nodes, a portion of SONET "overhead" bandwidth may be used to transmit MAC addresses between neighboring devices.

According to embodiments configured to transmit and/or receive data files via SNMP, computer-readable storage medium 670 may also include a data file reconstruction module 686 configured to receive and process multiple SNMP packets containing offset and data fields. Additionally, manager devices configured to transmit large files via SNMP according to the embodiments described herein may include a data file partitioning and packetizing module 688 configured to partition a large data file into a plurality of data packets. Data file partitioning and packetizing module 688 may be configured to packetize a plurality of partitions using tables in SNMP packets, including an offset field and data field.

Figure 7:
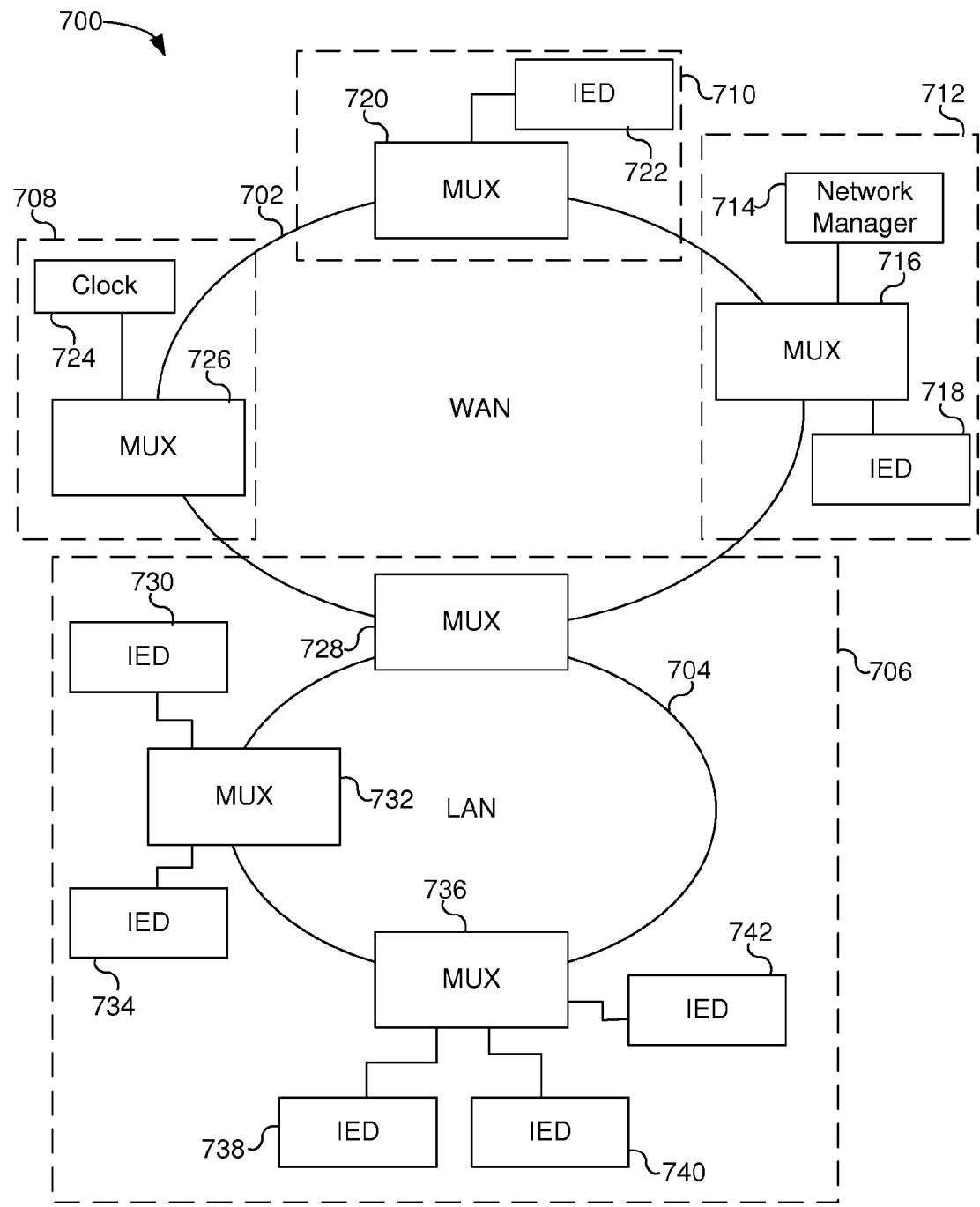
FIG. 7 is an exemplary block diagram of networked devices in an electric power system configured to perform network discovery and data transmission using SNMP.

FIG. 7 illustrates an exemplary block diagram of networked devices in an electric power system configured to perform network discovery and data transmission using SNMP. One particular application of the presently described system and method for network discovery and data transfer via SNMP includes that of networked power system distribution and monitoring equipment. According to various embodiments, the agent devices, illustrated as IEDs and multiplexers (MUXs), are configured in an IP network. The IEDs and MUXs are capable of communicating via SNMP. In certain embodiments, agent devices may be fully managed and configured using SNMP.

FIG. 7 illustrates a communications architecture 700 that facilitates the communication of information stored in IEDs networked using SNMP. The communications architecture 700 may include an inter-substation wide area network (WAN) 702 that operates according to a WAN communications protocol, such as Ethernet, SONET, SDH, and the like. The illustrated communications architecture 700 links four substations 706, 708, 710, and 712. Each substation communicates on WAN 702 using a MUX 728, 726, 716, and 720. Each MUX 728, 726, 716, and 720 is in communication with various IEDs (which may include additional MUXs) on the network. According to alternative embodiments, various IEDs or MUXs may be replaced with hubs, switches, other IEDS, computers, and/or other devices.

MUX 720 in substation 710 is in communication with IED 722, which may be a protective relay configured to protect, automate, control, monitor, and/or meter a certain portion of an electric power transmission or distribution system in conjunction with substation 710. MUX 726 of substation 708 may be in communication with a clock 724 for receiving and distributing a common time reference to devices on the WAN 702. MUX 716 of substation 712 may be in communication with IED 718. MUX 716 may further be in communication with a network manager 714 for managing network communications. MUX 728 of substation 706 may be in communication with MUXs 732 and 736 on an intra-substation network using a local area network (LAN) 704. LAN 704 may be configured to facilitate communications between the various IEDs of the substation 706. Devices connected to the LAN may be configured to use SNMP. MUX 732 may be in communication with IEDs 730 and 734, and MUX 736 may be in communication with IEDs 738, 740, and 742.

Network manager 714 may consist of software or computer instructions stored on a computer-readable medium and run using a processor. In one example, network manager 714 includes a computer or server running a commercially available network management software package such as SNMP. Accordingly, network manager 714 may serve as a manager device and perform network discovery of the various IEDs and MUXs connected to the networks using the methods described herein via SNMP. Each MUX and each IED may generate a custom MIB containing a list of neighboring devices and their associated IP addresses. The custom MIB may be generated using a method described herein.

Network manager 714 may query MUX 716 and obtain a neighbor address table that includes the IP addresses of the MUX's three neighbors 720, 728, and 718. In turn, network manager 714 will then query each of devices 720, 728, and 718 to obtain the IP addresses of each of their neighbors. Continuing as has been described previously, network manager 714 will iteratively query each of the IEDs and MUXs in the network until network discovery is complete.

According to one embodiment, using a communications architecture 700 similar to that illustrated in FIG. 7, it may be desirable to transfer large files from the network manager 714 to an IED, such as IED 738. Once network discovery is complete, the network manager 714 knows the path necessary to communicate with IED 738. Or alternatively, it knows at least the first leg of the path, and intermediary devices will forward communications until they reach an intended device. Thus, network manager 714 is able to packetize a large data file using the methods described herein and transfer the file to IED 738 via SNMP. According to one embodiment, each packet transmitted contains a row including an offset for determining packet order and a data field containing a partition of the original data file. Once the IED 738 has received all of the partitions of the data file, it may use the offset information associated with each partition in the packet to reconstruct the data file.

According to various embodiments, a data file may comprise firmware. Thus, networked IEDs in a power distribution and monitoring system may be discovered and may send or receive data files via SNMP that exceed the maximum size of an SNMP data packet using the systems and methods described herein. Specifically, following network discovery, a manager device or network manager is able to update the firmware of a networked IED via SNMP.

Figure 8:
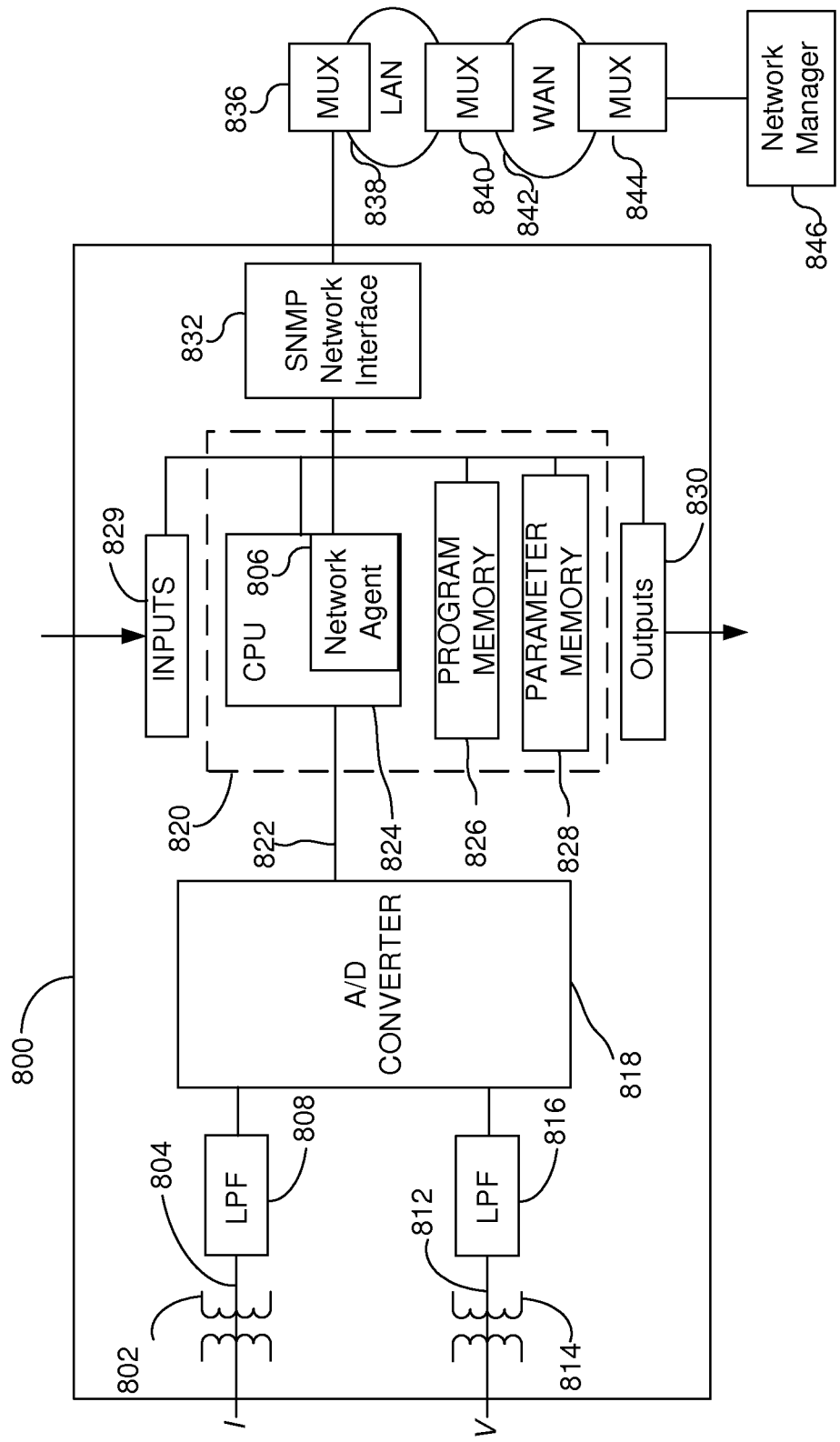
FIG. 8 is an exemplary block diagram of an intelligent electronic device configured to perform network discovery and data transfer via SNMP.

FIG. 8 illustrates an exemplary block diagram of an IED 800 configured to perform network discovery and data transfer via SNMP. Specifically, IED 800 may be configured for use in an electric power transmission or distribution system. IED 800 may be used, for example, in the power system's protection, automation, control, monitoring and/or metering applications to gather data directly from a conductor (not shown) using a current transformer 802 and/or a voltage transformer 814. Voltage transformer 814 may be configured to step-down the power system's voltage (V) to a secondary voltage waveform 812 having a magnitude that can be readily monitored and measured by IED 800 (e.g., to step-down the distribution line voltage from approximately 13 kV to approximately 120 V).

Similarly, current transformer 802 may be configured to proportionally step-down the power system's line current (I) to a secondary current waveform 804 having a magnitude that can be readily monitored and measured by IED 800 (e.g., to step-down the distribution line current from approximately 200 amps to approximately 0.2 amps). Low pass filters 808, 816 respectively filter the secondary current waveform 804 and the secondary voltage waveform 812. An analog-to-digital converter 818 then multiplexes, samples and/or digitizes the filtered waveforms to form a corresponding digitized current and voltage signals 822.

The digitized current and voltage signals 822 are received by a microcontroller 820 configured to perform digital signal processing. For example, the microcontroller 820 may use Cosine Filters to eliminate DC and unwanted frequency components from the digitized current and voltage signals 822. In one embodiment, microcontroller 820 includes a central processing unit (CPU) or microprocessor 824, a program memory 826 (e.g., a Flash EPROM), and a parameter memory 828 (e.g., an EEPROM). As will be appreciated by those skilled in the art, other suitable microcontroller configurations may be used.

Microprocessor 824, by executing a computer software module or logic scheme, may process the digitized current and voltage signals 822 to extract information, such as phasors, representative of the measured secondary voltage waveform 812 and the secondary current waveform 804. Microprocessor 824 may then perform various calculations and digital signal processing algorithms using the phasors. Microprocessor 824 may also be able to receive inputs 829 and provide outputs 830 based on the results of the calculations and digital signal processing.

IED 800 may further be configured to communicate information stored in the IED to other IEDs and devices connected on a LAN 838 and/or WAN 842 via SNMP. Microprocessor 824 may be configured to run a network agent 806 that is configured to communicate with SNMP network interface 832. SNMP network interface 832 may be configured to communicate with network manager 846 using SNMP via MUXs 836, 840, and 844 on LAN 838 and WAN 842. Network agent 806 may include software and/or computer instructions stored in a memory (such as the program memory 826) of microcontroller 820 or another computer-readable medium in communication with microcontroller 820. Network agent 806 may operate on microprocessor 824, or alternatively IED 800 may include a second microcontroller (such as an FPGA or microprocessor) on which network agent 806 may operate.

Network agent 806 may be configured to collect and store managed objects such as IED serial number, IED firmware version, IED location, IED health information, equipment information, and the like. Network agent 806 may then store a management information base (MIB). Related managed objects may be stored in separate MIB modules. Each network agent is further configured to communicate MIBs to the network manager upon request via SNMP.

Network agent 806 may further be configured to monitor specific managed objects and send a message when the status of a specific managed object changes. According to one embodiment, a managed object is a status ("OK" or "FAIL") of a circuit breaker. When the status of the circuit breaker changes from OK to FAIL, network agent 806 may be configured to send a message to network manager 846. Network manager 846 may then be configured to request a MIB from the specific IED. The MIB would include the status of the circuit breaker as FAIL, and appropriate action may be taken.

Using the configuration and structure illustrated herein, network manager 846 may be capable of discovering specific asset information about each IED 800 connected to LAN 838 and WAN 842. Further, the configuration and structure illustrated herein may be used to discover specific asset information about the monitored equipment.

In one example, IED 800 illustrated in FIG. 8 may be configured to automatically request the MAC addresses of neighboring devices. Using the MAC addresses of neighboring devices, network agent 806 may request the IP addresses of neighboring devices and create a neighbor address table, as disclosed herein. Following a request from network manager 846, IED 800 may provide the neighbor address table to network manager 846 via SNMP.

Furthermore, IED 800 may be configured to receive a plurality of packets corresponding to a data file, as described herein. IED 800 may be configured to reconstruct a data file using the information, such as an offset field and a data field contained in the table and/or rows of each SNMP packet as described herein. According to various embodiments, IED 800 may also be capable of transmitting files larger than the maximum SNMP packet size, by partitioning a data file into a plurality of packets prior to transmission as described herein. Thus, according to various embodiments, IED 800 may be configured to perform any of the various network discovery methods and/or packetized data transfer methods described herein.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed:

1. A method comprising:
   each plurality of agent devices connected by a network querying at least one neighboring agent device using a MAC address of the neighboring agent known to each of the plurality of agent devices to obtain an IP address of at least one neighboring agent device;
each agent device creating a neighbor address table comprising an IP address of the at least one neighboring agent device;
a manager device querying one of the plurality of networked agent devices to obtain the queried agent device's neighbor address table;
the queried agent device returning the queried agent device's neighbor address table;
the manager device adding each IP address comprised in the queried agent device's neighbor address table to a network inventory;
the manager device designating each IP address comprised in the queried agent device's neighbor address table as an unqueried agent device;
a discovery process comprising:
   the manager device querying an unqueried agent device in the network inventory to obtain the unqueried agent device's neighbor address table using Simple Network Management Protocol (SNMP);
   the unqueried device returning the unqueried agent device's neighbor address table;
   designating the unqueried agent device as a queried agent device;
   the manager device comparing each IP address comprised in the unqueried agent device's neighbor address table to IP addresses comprised in the network inventory and adding each new IP address to the network inventory as an unqueried agent device; and
   iteratively repeating the steps of the discovery process until each of the plurality of agent devices in the network inventory is designated as a queried agent device.

2. The method of claim 1, wherein each neighbor address table comprises a Management Information Base (MIB).

3. The method of claim 1, further comprising determining a topology of the plurality of agent devices by associating each agent device with each neighboring agent device according to each agent device's neighbor address table.

4. The method of claim 1, wherein at least one of the plurality of agent devices comprises an intelligent electronic device (IED) configured to monitor and control a component in an electrical power distribution system.

5. The method of claim 1, further comprising transferring data to one of the plurality of agent devices comprised in the network inventory, wherein transferring data comprises:
   the manager device dividing a data file into a plurality of sequenced partitions;
   the manager device creating a plurality of packets, each packet comprising at least one data field corresponding to one of the plurality of sequenced partitions, and an offset corresponding to the order of the data field relative to the plurality of sequenced partitions, such that each of the plurality of sequenced partitions is contained within a data field of one of the plurality of packets;
   the manager device transmitting the plurality of packets using Simple Network Management Protocol (SNMP) to one of the plurality of agent devices; and
   the one of the plurality of agent devices reconstructing the data file using the offsets and the sequenced partitions contained within the data fields of the plurality of packets.

6. The method of claim 1, further comprising each of the plurality of agent devices connected by the network transmitting a MAC address to neighboring devices via overhead bandwidth in a Synchronized Optical Networking packet.

7. A system for performing network discovery comprising:
a network comprising a plurality of agent devices, each of the plurality of agent devices configured to obtain an IP address of at least one neighboring agent device using a MAC address of the at least one neighboring agent and to create a neighbor address table comprising an IP address of the at least one neighboring agent device;
a manager device comprising:
   a processor, and a computer-readable storage medium in electrical communication with the processor and comprising computer instructions executable on the processor for performing a method of:
   querying one of the plurality of networked agent devices to obtain the queried agent device's neighbor address table; receiving the queried agent device's neighbor address table;
   adding IP addresses comprised in the queried agent device's neighbor address table to a network inventory; designating each IP address comprised in the queried agent device's neighbor address table as an unqueried agent device;
   a discovery process comprising:
      querying an unqueried agent device in the network inventory to obtain the unqueried agent device's neighbor address table using Simple Network Management Protocol (SNMP);
      receiving the unqueried agent device's neighbor address table;
      designating the unqueried agent device as a queried agent device;
      comparing each IP address comprised in the unqueried agent device's neighbor address table IP addresses comprised in the network inventory and adding each new IP address to the network inventory as an unqueried agent device; and
      iteratively repeating the steps of the discovery process until each of the plurality of agent device in the network inventory is designated as a queried agent device.

8. The system of claim 7, wherein each address table comprises a Management Information Base (MIB).

9. The system of claim 7, wherein the method further comprises determining a topology of the plurality of agent devices by associating each agent device with each neighboring agent device according to each agent device's neighbor address table.

10. The system of claim 7, wherein at least one of the plurality of agent devices comprises an intelligent electronic device (IED) configured to monitor and control a component in an electrical power distribution system.

11. The system of claim 7, wherein the plurality of agent devices communicate via Synchronized Optical Networking (SONET), and wherein the method further comprises each of the plurality of agent devices connected by the network transmitting a MAC address to neighboring devices via overhead bandwidth in a SONET packet.

12. The system of claim 7, wherein the method further comprises transferring data to one of the plurality of agent devices comprised in the network inventory, and wherein transferring data comprises:
   the manager device dividing a data file into a plurality of sequenced partitions;
   the manager device creating a plurality of packets, each packet comprising,
      at least one data field corresponding to one of the plurality of sequenced partitions, and an offset corresponding to the order of the data field relative to the plurality of sequenced partitions, such that each of the plurality of sequenced partitions is contained within a data field of one of the plurality of packets;

the manager device transmitting the plurality of packets using Simple Network Management Protocol (SNMP) to one of the plurality of agent devices;

the one of the plurality of agent devices reconstructing the data file using the offsets and the sequenced partitions contained within the data fields of the plurality of packets.

13. An intelligent electronic device (IED) comprising:
a Simple Network Management Protocol (SNMP) network interface;
a processor in communication with the SNMP network interface;
a computer-readable storage medium in electrical communication with the processor and comprising computer instructions executable on the processor for performing a method of:

querying at least one neighboring agent device using a MAC address of the at least one neighboring agent device to obtain an IP address of at least one neighboring agent device;

creating a neighbor address table comprising an IP address of the at least one neighboring agent device;

receiving a query to obtain the neighbor address table via the SNMP network interface; and returning the neighbor address table via the SNMP network interface in response to the query.

14. The IED of claim 13, wherein the IED is further configured to monitor and control a component in an electrical power distribution system.

15. The IED of claim 14, wherein the IED is configured to receive a configuration instruction via the SNMP network interface and to implement the configuration instruction by controlling the component in the electrical power distribution system.

* * * * *